(12) United States Patent
Rose Dit Rose

(10) Patent No.: US 9,045,348 B2
(45) Date of Patent: *Jun. 2, 2015

(54) TITANIUM-SILICON PROTECTIVE FILM COMPOSITION AND APPARATUS

(75) Inventor: Franck Dreyfus Rose Dit Rose, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 131 days.

This patent is subject to a terminal disclaimer.

(21) Appl. No.: 13/598,102

(22) Filed: Aug. 29, 2012

(65) Prior Publication Data

US 2014/0065444 A1 Mar. 6, 2014

(51) Int. Cl.
| | |
|---|---|
| *G11B 5/72* | (2006.01) |
| *C01B 31/36* | (2006.01) |
| *C01B 33/00* | (2006.01) |
| *C09D 1/00* | (2006.01) |
| *C01B 31/30* | (2006.01) |
| *C04B 35/56* | (2006.01) |
| *C04B 35/58* | (2006.01) |
| *C04B 35/584* | (2006.01) |

(52) U.S. Cl.
CPC ........... *C01B 31/36* (2013.01); *Y10T 428/1164* (2013.01); *C01B 33/00* (2013.01); *C09D 1/00* (2013.01); *G11B 5/72* (2013.01); *C01B 31/301* (2013.01); *C04B 35/5615* (2013.01); *C04B 35/58021* (2013.01); *C04B 35/584* (2013.01); *C04B 2235/77* (2013.01)

(58) Field of Classification Search
None
See application file for complete search history.

(56) References Cited

U.S. PATENT DOCUMENTS

| | | |
|---|---|---|
| 4,503,125 A | 3/1985 | Nelson et al. |
| 4,647,494 A | 3/1987 | Meyerson et al. |
| 4,898,774 A | 2/1990 | Yamashita et al. |
| 5,624,725 A | 4/1997 | Nelson et al. |
| 5,779,823 A * | 7/1998 | Thom et al. .................. 148/423 |
| 5,815,343 A * | 9/1998 | Ishikawa et al. ........... 360/97.22 |
| 6,572,958 B1 | 6/2003 | Chour et al. |
| 6,583,953 B1 | 6/2003 | Han et al. |

(Continued)

OTHER PUBLICATIONS

Fujitsu Laboratories, Lubrication Technology that Prevents Corrosion Hard Disk Drive Media, Mar. 2005.

(Continued)

*Primary Examiner* — Kevin Bernatz
(74) *Attorney, Agent, or Firm* — Kunzler Law Group, PC

(57) ABSTRACT

The present disclosure relates to a protective layer composition that includes $Ti_xSi_yA$, where A is $C_m$, $C_mN_l$, $O_nC_m$, or $O_nC_mN_l$ and x, y, l, m, and n are positive integers. In one implementation, the protective layer composition has a ratio of x over (x+y) in the range of between about 0.1 and about 1.0. In another implementation, the protective layer composition has a ratio of x over (x+y) in the range of between about 0.3 and about 0.9. In yet another implementation, the protective layer composition has a ratio of x over (x+y) that is about 0.6. The protective layer composition may be amorphous. Also, the protective layer composition may include an atomic percentage of Ti that is less than about 20%. In one implementation of the protective layer composition, x is 2, y is 1, and A is $C_3$.

11 Claims, 6 Drawing Sheets

(56) References Cited

U.S. PATENT DOCUMENTS

| | | |
|---|---|---|
| 6,586,070 B1 | 7/2003 | Dai et al. |
| 6,660,413 B1 | 12/2003 | Thangaraj et al. |
| 6,680,106 B1 | 1/2004 | Thangaraj et al. |
| 7,592,076 B2 * | 9/2009 | Flink et al. .................... 428/697 |
| 8,507,110 B2 * | 8/2013 | Ahlgren ........................ 428/697 |
| 8,716,121 B2 * | 5/2014 | Seki et al. .................... 438/602 |
| 8,846,531 B2 * | 9/2014 | Tamaso et al. ................ 438/685 |
| 2005/0262965 A1 * | 12/2005 | Palanisamy et al. ............ 75/236 |
| 2007/0284255 A1 * | 12/2007 | Gorokhovsky et al. ......... 205/89 |
| 2008/0259497 A1 * | 10/2008 | Nakamura et al. ......... 360/235.1 |
| 2010/0265618 A1 * | 10/2010 | Boutaghou et al. ........ 360/234.3 |
| 2011/0032640 A1 | 2/2011 | Marchon et al. |
| 2013/0094109 A1 * | 4/2013 | Marchon et al. .............. 360/244 |
| 2013/0114165 A1 * | 5/2013 | Mosendz et al. .............. 360/244 |
| 2014/0178637 A1 * | 6/2014 | Rajagopalan et al. ........ 428/141 |
| 2014/0287161 A1 * | 9/2014 | Ertas et al. .................... 427/569 |

OTHER PUBLICATIONS

Rose et al, Ultrathin TiSiN Overcoat Protection Layer for Magnetic Media, J. Vac. Sci. Technol. A 29(5), Jul. 14, 2011.

* cited by examiner

TITANIUM-SILICON PROTECTIVE FILM COMPOSITION AND APPARATUS

FIELD

The subject matter of the present disclosure relates to protective films and more particularly relates to thin titanium-silicon based overcoat films.

BACKGROUND

Protective layers are often applied to various substances in order to defend and shield the substances from being damaged, scratched, smashed, dented, shattered, destroyed or otherwise adversely affected. Car wax, wood finishing products, sealants, zinc layers (galvanization), and protective polymer films, among others, are examples of protective materials that can be applied on different objects in order to prevent the objects from being damaged. A protective layer is generally selected according to its ability to defend a substance against a certain threat or a specific set of circumstances. For example, certain protective layers are especially formulated to protect a substance from thermal fluctuations while other protective layers may be especially designed to protect against continuous and repeated physical contact with other objects.

In the field of nano-technology, protective layers are especially important not only because of the dimension and structure of the nano-sized components but because nano-sized-devices, such as hard disk drives and integrated circuits, are configured to repeatedly perform the same action (e.g. recording/storing information). For example, when dealing with nano-sized features on an integrated circuit or nano-sized magnetic domains on a hard disk drive, the thickness, density, tribological properties, and reactivity of the protective material greatly affects the functionality of the components of the nano-device.

Conventional protective layers, commonly referred to as carbon overcoats ("COC"), provide increasingly inadequate protection as the size of the features on nano-devices decreases. This inadequacy may be due, in part, to the need for conventional protective layers to be applied thinner across the magnetic medium because the read/write head must be located closer to the magnetic material in order to read the information recorded on and write the information to the smaller magnetic domains/bits. However, when conventional protective layers are not sufficiently thick, the protective layer does not adequately protect the underlying material from corrosion, and does not prevent the formation and build-up of undesired byproducts on the surface of the protective layer, among other negative side effects.

SUMMARY

From the foregoing discussion, it should be apparent that a need exists for a protective layer composition that can adequately protect the underlying material without substantially increasing in thickness. The subject matter of the present application has been developed in response to the present state of the art, and in particular, in response to the problems and needs in the art that have not yet been fully solved by currently available protective layers. Accordingly, the present disclosure has been developed to provide a protective layer composition and structure that overcomes many or all of the above-discussed shortcomings in the art.

The present disclosure relates to a protective layer composition that includes $Ti_xSi_yA$, where A is $C_m$, $C_mN_l$, $O_nC_m$, or $O_nC_mN_l$ and x, y, l, m, and n are positive integers. In one implementation, the protective layer composition has a ratio of x over (x+y) in the range of between about 0.1 and about 1.0. In another implementation, the protective layer composition has a ratio of x over (x+y) in the range of between about 0.3 and about 0.9. In yet another implementation, the protective layer composition has a ratio of x over (x+y) that is about 0.6. The protective layer composition may be amorphous. Also, the protective layer composition may include an atomic percentage of Ti that is less than about 20%. In one implementation of the protective layer composition, x is 2, y is 1, and A is $C_3$.

The present disclosure also relates to a magnetic recording medium that includes a substrate, a magnetic layer coating the substrate, and a protective layer of a specific thickness coating the magnetic layer. The protective layer has a composition that includes $Ti_xSi_yA$, where A is $C_m$, $C_mN_l$, $O_nC_m$, or $O_nC_mN_l$ and x, y, l, m, and n are positive integers. The magnetic layer in one implementation includes cobalt. In another embodiment, the specific thickness of the protective layer is in the range of between about 5 and 50 angstroms. In another implementation, the specific thickness of the protective layer is in the range of between about 15 and 30 angstroms. In yet another implementation, the specific thickness of the protective layer is about 25 angstroms.

Further included in the present disclosure is a description of a magnetic hard disk drive device that has a substrate, a magnetic layer coating the substrate, a protective layer of a specific thickness coating the magnetic layer, and a read/write head capable of flying at a specific distance away from the surface of the protective layer during operation of the magnetic hard disk drive device. The protective layer may include a composition of $Ti_xSi_yA$, where A is $C_m$, $C_mN_l$, $O_nC_m$, or $O_nC_mN_l$ and x, y, l, m, and n are positive integers. The magnetic hard disk drive device may include a read/write head that is in the range of between about 10 and about 200 angstroms away from the protective layer. In another implementation, the magnetic hard disk drive device may include a read/write head that is in the range of between about 30 and about 100 angstroms away from the protective layer. In yet another implementation, the magnetic hard disk drive device includes a read/write head that is about 60 angstroms away from the protective layer.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

The present disclosure relates generally to protective layers that contain titanium and silicon and that can be used in myriad applications. A large portion of this disclosure will be in reference to a protective layer applied over a magnetic storage medium. The disclosure focuses to a major extent on protective layers that coat magnetic storage media because the overall dimensions and stringent operating conditions involved with magnetic storage devices provides an exemplary environment in which to effectively describe and disclose the details relating to and the benefits derived from the novel protective layer structure, morphology, and composition of the present disclosure.

Once again, even though a large portion of this disclosure is in reference to a protective layer applied over magnetic storage media, the scope of the present disclosure is not limited to overcoat films on magnetic storage devices. For example, it is contemplated that the protective layer may be applied over other data storage devices, integrated circuits, electronic device components, and physical mechanisms. It is also contemplated that the protective layer may be used as a container liner, material finishing composition, buffer material, separation membrane, migration barrier, and chemical reaction inhibitor, among others.

Figure 1:
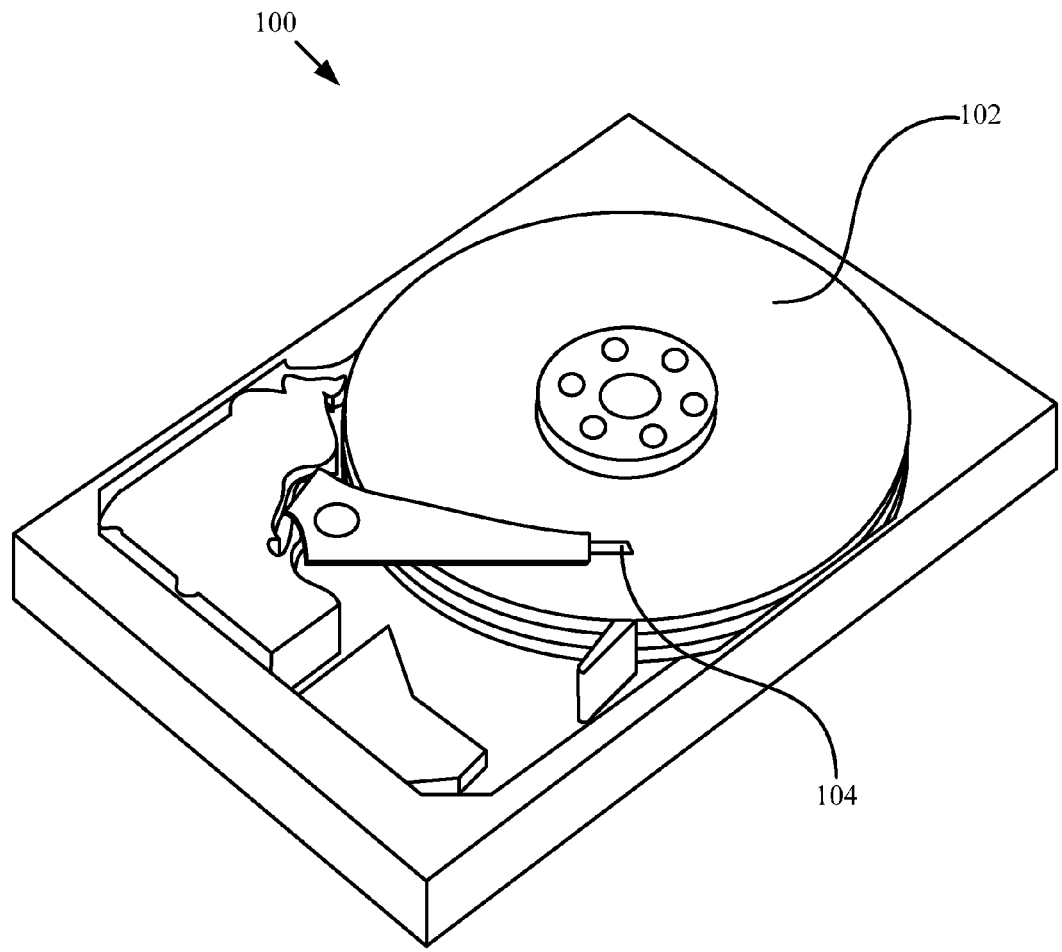
FIG. 1 is a perspective view of one embodiment of a magnetic storage device.

FIG. 1 is a perspective view of one embodiment of a magnetic storage device 100. The magnetic storage device 100 includes a magnetic medium 102 and a head 104 for reading and writing information on the magnetic medium 102. There are various types of magnetic storage devices 100. For example, conventional granular magnetic recording disks are generally wafers that have magnetic layer bits with multiple magnetic grains on each bit. In granular magnetic media, all of the bits are co-planar and the surface of the disk is substantially smooth and continuous. In one embodiment, each bit has a magnetic dipole moment that can either have an in-plane (longitudinal) orientation or an out-of-plane (perpendicular) orientation.

In order to increase the amount of information that can be stored on a granular magnetic disk, the bit size may be decreased while keeping the grain size the same. However, with smaller bits there are fewer grains on each bit, which decreases the signal to noise ratio (less signal, more noise). In order to maintain a better signal to noise ratio, methods have been developed that decrease both the bit size and the grain size, thus keeping the same number of grains on each bit. However, when the grains become too small, thermal fluctuations can cause the grains to spontaneously reverse polarity, thus resulting in unstable storage and a loss of information.

Bit-patterned media devices are another example of magnetic storage devices 100. In bit-patterned media, the bits are physically etched into a surface using conventional lithographic and etching techniques. In contrast to granular magnetic recording media, bit-patterned media are topographically patterned with intersecting trenches and elevated bit islands. In some instances, the trenches are etched directly into a magnetic layer. In other instances, the physical patterns are etched into a substrate and then a magnetic layer is coated over the patterned substrate. Because of the physical separation between the elevated bit islands and the trenches, the width of each distinct bit island can be decreased in order to increase the areal bit density of the device while still maintaining a high signal-to-noise ratio and thermal stability.

Other techniques have been and are currently being developed to increase the pattern density of bit-patterned media. For example, directed self-assembly of block copolymers has been implemented for achieving bit densities of greater than 1 Tbit/in$^2$. As further described specifically in U.S. Pat. No. 8,059,350 and U.S. Pat. No. 8,119,017, both of which are assigned to the same assignee as this application, directed self-assembly of block copolymers can be used to multiply the areal bit density and/or to rectify the conventional lithographic bit pattern.

Thus, regardless of the type of magnetic recording medium, fabricators are continuously striving to store more information per unit area by reducing the size of magnetic domains. With the decrease in size of the magnetic domains and other surface features, the head 104 must have the capability to interact with these smaller magnetic domains in order to read/write information. In one embodiment, the head 104 may be able to better interact with the magnetic medium 102 if the head 104 were able to fly closer to the surface of the medium 102 during operation of the magnetic storage device 100. As will be described in greater detail below, a protective layer of the present disclosure may be employed to allow the head 104 to operate closer to the surface of the magnetic medium 102.

Figure 2:
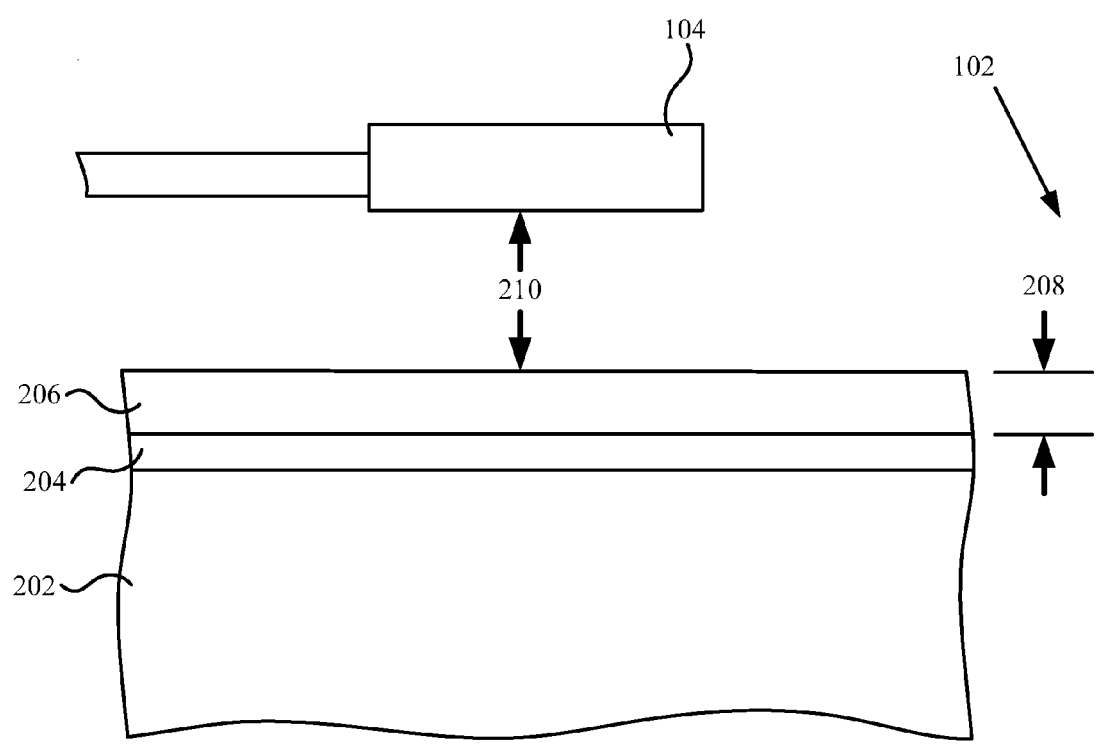
FIG. 2 is cross-sectional side view of one embodiment of the magnetic storage device.

FIG. 2 is cross-sectional side view of one embodiment of the head 104 over the magnetic medium 102. The magnetic medium 102, in one embodiment, includes various components such as substrate 202, magnetic layer 204, and protective layer 206. As discussed in greater detail below, the protective layer 206 may have a specific thickness 208 and the head 104 may be spaced a distance 210 away from the protective layer 206.

The substrate 202, in one embodiment, is a type of semiconductor, such as silicon. In another embodiment the substrate 202 may include quartz, silicon dioxide, $SiO_2$, glass, aluminum alloy, nickel alloy, silicon alloy, and the like. If the medium 102 is a bit-patterned medium, an inert filler material (not depicted) may be added between the physically formed bits of the substrate 202 (in the trenches) in order to create a substantially smooth surface so that the tops of the bits are coplanar with the surface of the filler material. In another embodiment the bit-patterned medium includes a substantially flat/continuous substrate upon which the magnetic layer(s) 204 are applied before etching so that the pattern of trenches and/or islands is formed directly into the magnetic material itself.

In one embodiment, the magnetic layer 204 may actually include multiple magnetic layers (not depicted). For example the magnetic layer 204 may include two magnetic layers spaced apart by a non-magnetic intermediate layer. It is also contemplated that more than two magnetic layers may comprise the magnetic recording medium of the present disclosure and that more than one intermediate layer may space apart the multiple magnetic layers.

In one embodiment, each magnetic layer 204 includes a single metallic component and in other embodiments each magnetic layer 204 includes metallic alloys and/or multiple metallic components. Typical materials that comprise a magnet generally include iron, cobalt, nickel, and alloys thereof. Ferromagnetic alloys also may include oxides, platinum group metals (e.g. ruthenium, rhodium, palladium, and platinum), transition metals, and the like. The composition of the magnetic layers, whether consisting of a single component or a metallic alloy mixture, may be selected according to the specifics of a given application.

Throughout the present disclosure, the term "magnetic layer" may refer to a layer made from any ferromagnetic material that has the characteristics of a permanent magnet (i.e. a material that, in pertinent part, exhibits a net magnetic moment in the absence of an external magnetic field). Magnetism is the result of moving electric charge. For example, the spin of an electron in an atom or a molecule creates a magnetic dipole. A magnetic field is created when the magnetic dipoles in a material result in a net magnitude and direction. Thus, the magnetism of a material is directly related to the magnitude, direction, inter-alignment, and interaction of the magnetic dipoles in the material. For example, when an external magnetic field is applied over a piece of iron, adjacent dipoles generally align in the direction of the magnetic field and substantially remain aligned in the same direction even after the external field is removed, thus creating a net magnetic moment.

As briefly discussed above, an increase in the bit density on a magnetic recording medium 102 requires a commensurate increase in the ability of the head 104 to read from and write to these smaller magnetic bits. Additionally, with the advent of increased feature density, multiple magnetic layers and multiple intermediate and other secondary layers, it becomes even more important, in one embodiment, for the protective layer 206 to prevent damage to the complex structure and organization of the underlying layers.

Because of the structure and composition of the novel protective layer 206, as described in greater detail below with reference to FIG. 3, the protective layer 206 may be substantially thinner than conventional protective layers and yet may still perform at least as well as conventional protective layers in shielding the underlying materials. In one embodiment, the thickness 208 of the protective layer 206 is in the range of between about 5 and about 50 angstroms. In another embodiment, the thickness 208 of the protective layer 206 is in the range of between about 15 and about 30 angstroms. In yet another embodiment, the thickness 208 of the protective layer 206 is about 25 angstroms. Especially within these thickness ranges, the protective layer material, according to one embodiment, is substantially amorphous.

Because the protective layer 206 may be comparatively thinner than conventional protective layers, the head 104, in one embodiment, may be configured to move across the surface of the medium 102 with a smaller distance 210 between the head 104 and the protective layer 206. In one embodiment, the distance 210 between the head 104 and the protective layer 206 is in the range of between about 10 and about 200 angstroms. In another embodiment, the distance 210 between the head 104 and the protective layer 206 is in the range of between about 30 and about 100 angstroms. In yet another embodiment, the distance 210 between the head 104 and the protective layer 206 is about 60 angstroms. According to one embodiment, the closer the head 104 is to the magnetic layer 204 the better the signal to noise ratio of the protected magnetic bits of information.

The protective layer 206 of the present disclosure performs various functions and provides various other benefits that will be described in the following pages. Specifically, the protective layer 206 of the present disclosure is more dense than conventional protective layers (see FIG. 3), reduces the surface energy and consequently the general reactivity of the patterned medium (see FIGS. 4, 5A, and 5B), and decreases the corrosion of the underlying materials (see FIG. 6), among others.

Figure 3:
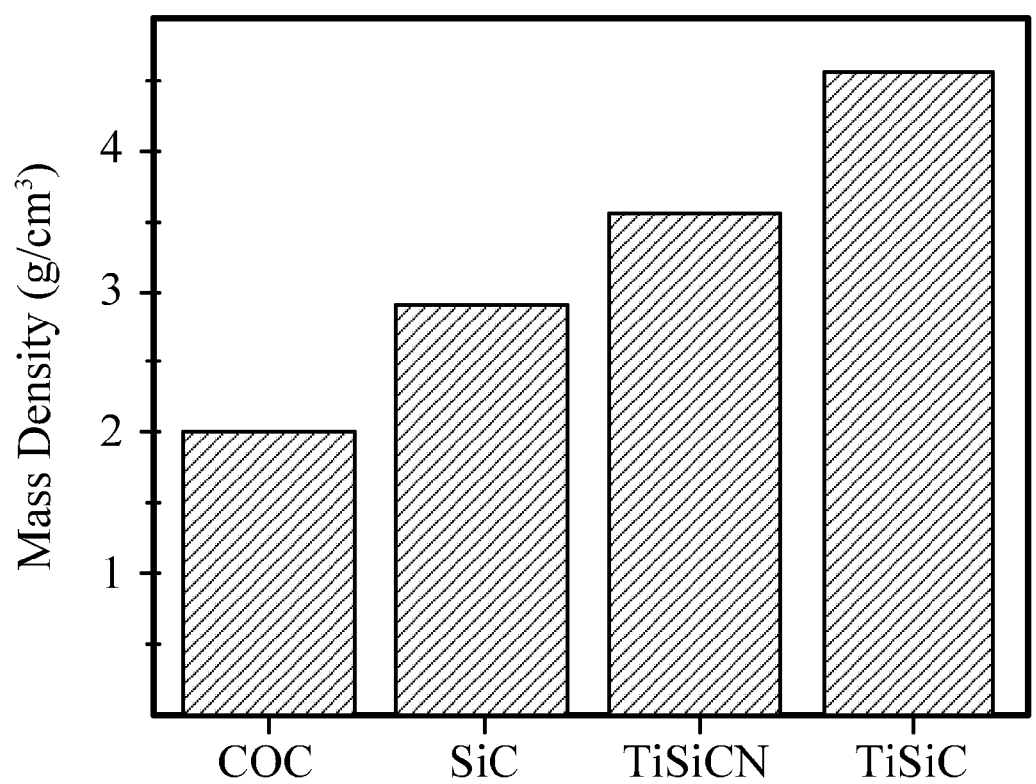
FIG. 3 is a chart showing the mass densities of various protective layer compositions.

FIG. 3 is a chart showing the mass densities of various protective layer compositions. As described briefly above, conventional carbon overcoats ("COC") and silicon carbide ("SiC") have been used as protective layers. As seen in FIG. 3, COC and SiC are comparatively less dense than protective layers that contain titanium. For example, a titanium silicon carbonitride ("TiSiCN") compound and a titanium silicon carbide ("TiSiC") compound, according to one embodiment, have mass densities of about 3.5 g/cm$^3$ and 4.5 g/cm$^3$, respectively.

Other titanium containing compounds, such as a titanium silicon nitride ("TiSiN"), a titanium silicon oxycarbide ("TiSiOC"), and a titanium silicon oxycarbonitride ("TiSiOCN"), may also be implemented as protective layers that have a greater comparative density. All of these titanium-silicon containing protective layers may include various combinations of the named elements. In other words, TiSiC compounds do not exclusively refer to a compound that has a single titanium, a single silicon, and a single carbon. Instead, TiSiC compounds refer to compounds that have any of various combinations of those elements, such as Ti$_2$SiC$_3$. In addition to increased density, these titanium containing protective layers may also be applied onto a material (e.g. metallic layer, substrate) through sputtering or other known thin-film deposition. For example, in one embodiment the deposition method may be selected according to the specifics of a given application or because the method has high throughput and manufacturing compatibility.

In one embodiment, the protective layer composition is selected according to the relative atomic amounts of titanium and silicon. For example, by using a modified atomic percentage of titanium (defined herein as "R") that is based on the sum of silicon and titanium atoms, instead of the total number of atoms in the protective layer compound, as follows:

$$\frac{\text{\# of Ti atoms}}{(\text{\# of Ti atoms} + \text{\# of Si atoms})}$$

the relative amounts of titanium and silicon are readily apparent. For example, in one embodiment, the modified atomic percentage is in the range of between about 0.1 and about 1.0.

In another embodiment, the modified atomic percentage is in the range of between about 0.3 and about 0.9. In yet another embodiment, the modified atomic percentage is about 0.6.

Figure 4:
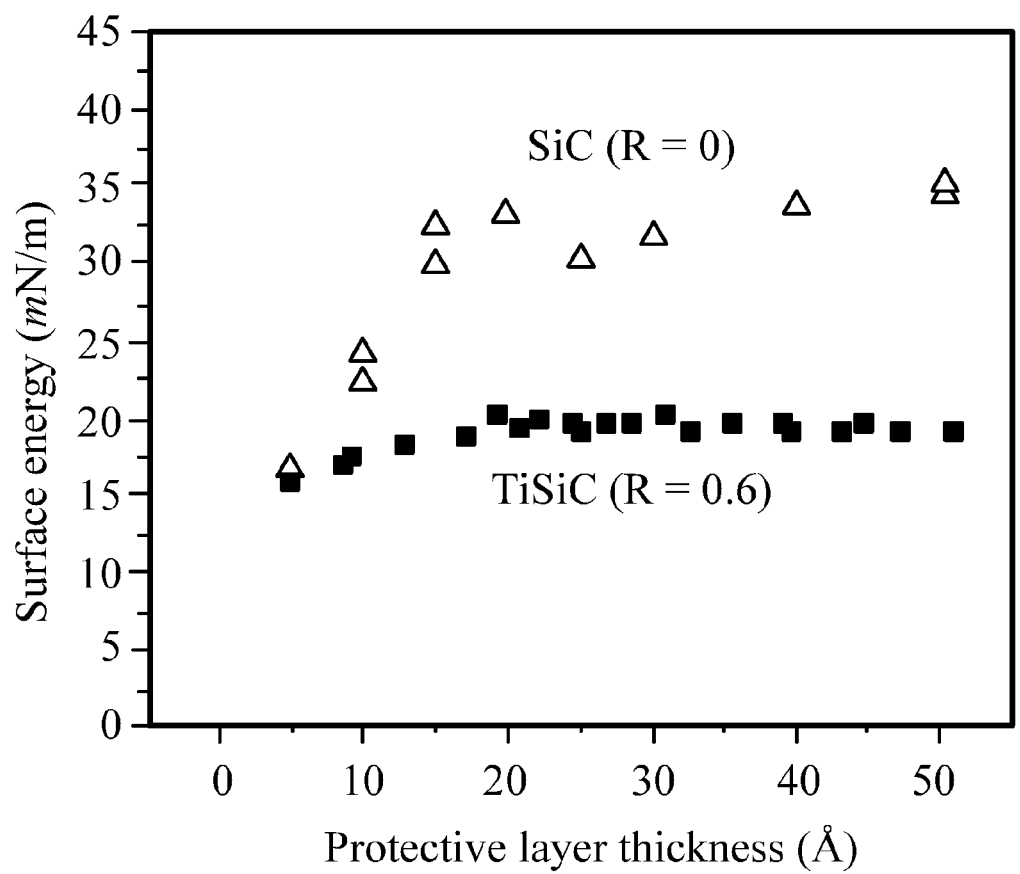
FIG. 4 is a chart showing the surface energy of two protective layer compositions as a function of protective layer thickness.

FIG. 4 is a chart showing the measured surface energy of two protective layer compositions as a function of protective layer thickness. The surface energy of the protective layer, which is generally defined as the excess energy at the surface of a material when compared to the bulk, influences the overall reactivity of the protective layer. In other words, the higher the surface energy the more chemically active the protective layer is and the more chemically active the protective layer is the likelihood increases that detrimental reactions that either corrode the protective layer or cause unwanted chemical build-up on the surface. Conversely, the lower the surface energy, the less chemically active the protective layer.

The two protective layer compounds shown in FIG. 4, whose surface energies were measured by a droplet contact angle method, are SiC, with an R value equal to 0 since there is no titanium present, and TiSiC, with an R value equal to 0.6 (titanium rich). The top data, marked by the hollow triangle shapes, represent a conventional SiC protective layer that does not contain titanium and that has a surface energy that, in one embodiment, moderately increases as the thickness of the protective layer increases. The bottom data, marked by the solid square shapes, represent a TiSiC protective layer that has a surface energy that, in one embodiment, is substantially independent of the protective layer thickness (at least beyond a thickness of about 20 angstroms).

The significant difference between the two sets of data is not the relative surface energy response dependence on protective layer thickness but rather the difference in surface energy magnitude at thicknesses above 15 angstroms. The TiSiC protective layer has noticeably less surface energy and therefore may provide a comparatively more stable and durable level of protection. Although not depicted in a chart, other titanium silicon containing protective layers, such as those described above with reference to FIG. 3, also have comparatively less surface energy than conventional protective layers.

Figure 5A:
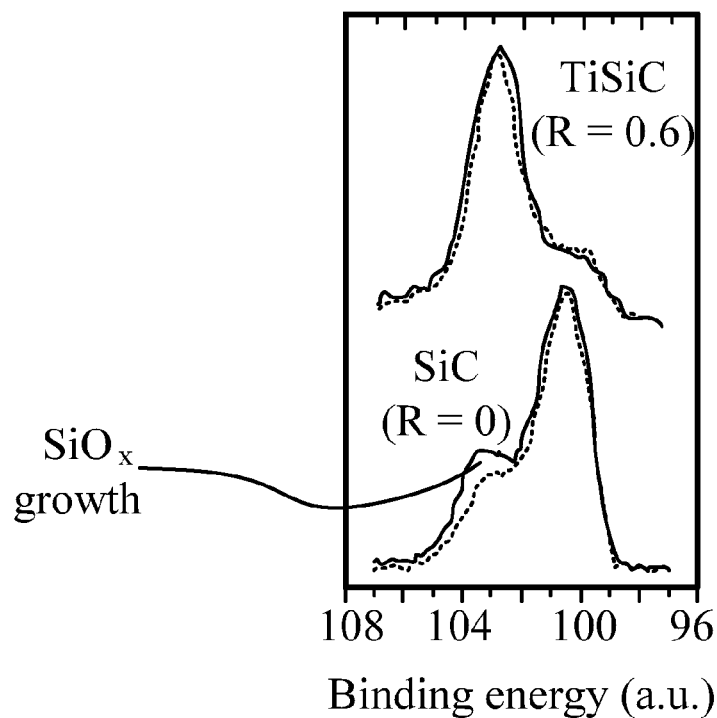
FIG. 5A is a chart showing a representation of silicon oxide growth on two protective layers after a hydrolysis reaction, as measured by x-ray photoelectron spectroscopy.

FIG. 5A is a chart showing a representation of silicon oxide growth on two protective layers after a hydrolysis reaction, as measured by x-ray photoelectron spectroscopy. Once again, the depicted embodiment shows a conventional protective layer that does not contain titanium (SiC) and a titanium containing protective layer (TiSiC). In the depicted chart, the location of the peaks, corresponding with a binding energy, represent the presence of various chemical bonds present in the protective layer. According to one embodiment, if silicon oxide is present in the protective layer, a peak will appear at around 103 electron-volts ("eV") and the dimensions of the peak are proportional to the number of silicon oxide bonds in the protective layer and thus the amount of silicon oxide growth.

The dotted lines show a representation of the chemical bonds that were present before the protective layers were exposed to humidity (i.e. hydrolysis prone environment) and the solid lines show a representation of the chemical bonds that were present after the protective layers were exposed to humidity Since hydrolysis is the dissolution of water ($H_2O$) into hydrogen and oxygen, the oxygen generated through hydrolysis bonds with the silicon in the conventional protective layer to form silicon oxide components.

As seen in the depicted embodiment, the SiC layer shows a raised peak in the post-hydrolysis line at about 103 eV, which indicates an increase in the number of silicon oxide bonds and therefore an undesirable growth of silicon oxide on the surface of the SiC protective layer. The TiSiC protective layer did not show a significant increase in peak dimensions and therefore, according to one embodiment, the TiSiC prevented silicon oxide growth on the surface of the protective layer.

As briefly described above, the incorporation of titanium into protective layers appears to hinder and prevent silicon oxide growth. According to one embodiment, silicon oxide growth is detrimental to the magnetic medium 102 because the growing silicon oxide molecules may interfere with the interaction of the head 104 with the magnetic layer(s) 204. For example, too much silicon oxide growth may cause the head to crash into the disk drive, potentially causing permanent damage and a loss of stored information.

Figure 5B:
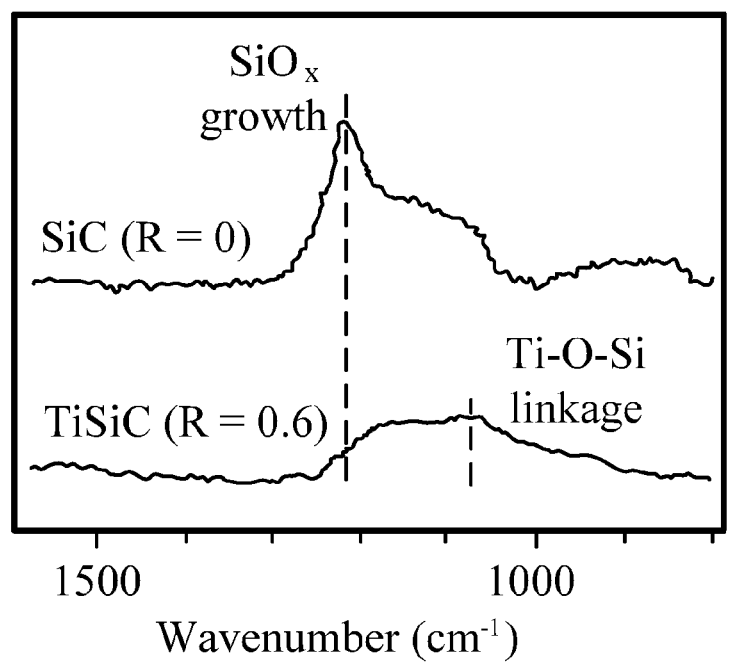
FIG. 5B is a chart showing a representation of silicon oxide growth on two protective layers after a hydrolysis reaction, as measured by fourier transform infrared spectroscopy.

FIG. 5B is a chart showing a representation of silicon oxide growth on two protective layers after a hydrolysis reaction, as measured by fourier transform infrared spectroscopy. Similar to FIG. 5A, this figure shows the comparative amounts of silicon oxide present in SiC and TiSiC, wherein SiC has a much broader and taller peak at about 1200 $cm^{-1}$, thus indicating a comparatively larger amount of silicon oxide formation after hydrolysis.

The increased density and decreased surface energy of the titanium containing protective layers 206 may be due in part to the Ti—O—Si linkages which are present in titanium containing protective layers 206. In one embodiment, these linkages, represented by a peak in the TiSiC line at about 1080 $cm^{-1}$, may also play a role in reducing oxygen diffusion and protecting the magnetic layer 204 and other underlying layers from corrosion.

Figure 6:
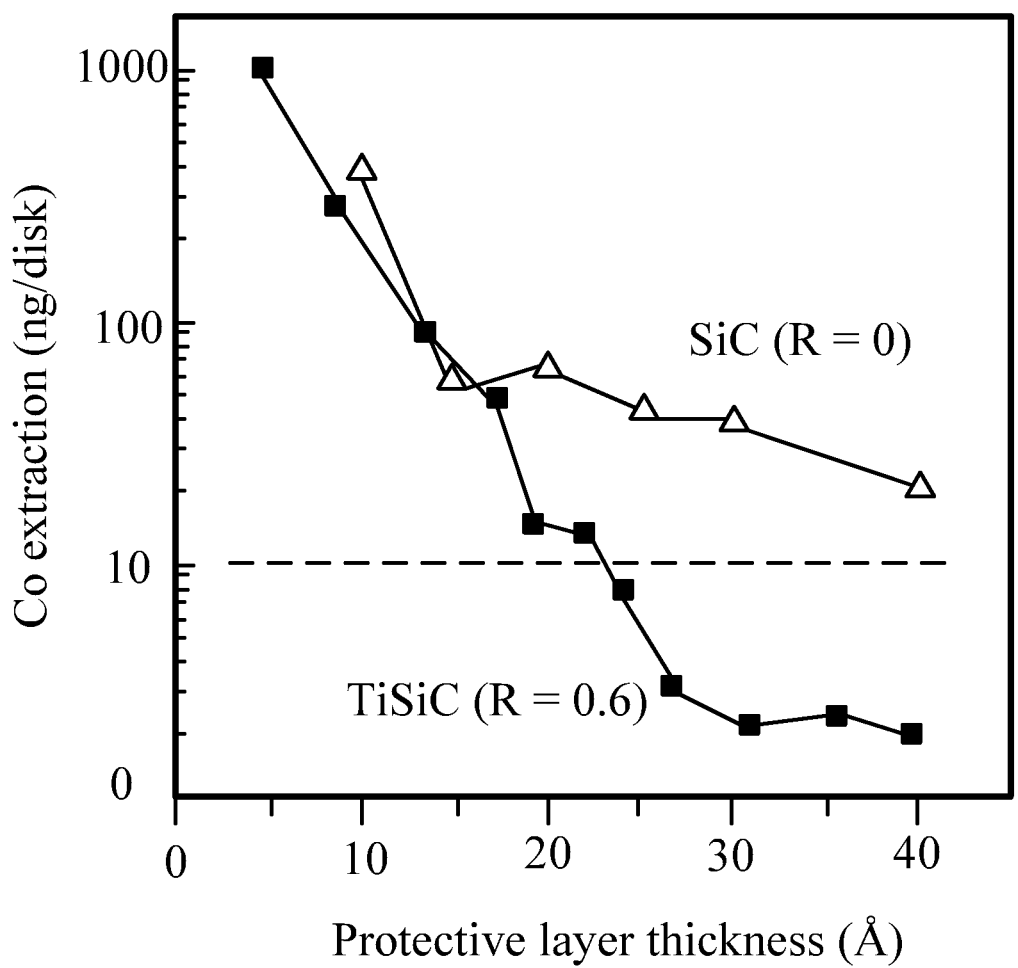
FIG. 6 is a chart showing cobalt extraction for two protective layers as a function of protective layer thickness.

FIG. 6 is a chart showing cobalt extraction for two protective layers as a function of protective layer thickness. In one embodiment where cobalt is used as the magnetic material, the extraction of cobalt may be the result of corrosive reactions. Corrosion is the gradual destruction of a material by chemical processes. In order for a magnetic storage device to be useful, the magnetic material that stores the information needs to be protected from chemical reactions that would otherwise corrode and destroy the material. In one embodiment, the protective layer 206 prevents reactants, such as oxygen and other oxidizing agents, from contacting the magnetic material, thus preventing the corruption and oxidation of the magnetic material.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the disclosure.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A protective layer composition, comprising: $Ti_xSi_yA$, wherein A is selected from the group consisting of $C_m$, $C_mN_l$, $O_nC_m$, and $O_nC_mN_l$, wherein x, y, l, m, and n are positive integers, wherein the protective layer is amorphous, and wherein x is 2, y is 1, and A is $C_3$.

2. The protective layer composition of claim 1, wherein the atomic percentage of Ti is less than about 20%.

3. A magnetic recording medium, comprising:
a substrate;
a magnetic layer coating the substrate; and
a protective layer of a specific thickness coating the magnetic layer, the protective layer comprising $Ti_xSi_yA$, wherein A is selected from the group consisting of $C_m$, $C_mN_l$, $O_nC_m$, and $O_nC_mN_l$, wherein x, y, l, m, and n are positive integers, wherein the protective layer is amorphous, and wherein x is 2, y is 1, and A is $C_3$.

4. The magnetic recording medium of claim 3, wherein the magnetic layer comprises cobalt.

5. The magnetic recording medium of claim 3, wherein the specific thickness of the protective layer is in the range of between about 5 and about 50 angstroms.

6. The magnetic recording medium of claim 3, wherein the specific thickness of the protective layer is in the range of between about 15 and about 30 angstroms.

7. The magnetic recording medium of claim 3, wherein the specific thickness of the protective layer is about 25 angstroms.

8. A magnetic hard disk drive device, comprising:
a substrate;
a magnetic layer coating the substrate;
a protective layer of a specific thickness coating the magnetic layer, the protective layer comprising $Ti_xSi_yA$, wherein A is selected from the group consisting of $C_m$, $C_mN_l$, $O_nC_m$, and $O_nC_mN_l$, wherein x, y, l, m, and n are positive integers, wherein the protective layer is amorphous, and wherein x is 2, y is 1, and A is $C_3$; and
a read/write head capable of flying at a specific distance away from the surface of the protective layer during operation of the magnetic hard disk drive device.

9. The magnetic hard disk drive device of claim 8, wherein the distance between the read/write head and the surface of the protective layer is in the range of between about 10 and about 200 angstroms.

10. The magnetic hard disk drive device of claim 8, wherein the distance between the read/write head and the surface of the protective layer is in the range of between about 30 and about 100 angstroms.

11. The magnetic hard disk drive device of claim 8, wherein the distance between the read/write head and the surface of the protective layer is about 60 angstroms.

* * * * *